United States Patent

Ryu

[11] Patent Number: 5,865,542
[45] Date of Patent: Feb. 2, 1999

[54] GUIDE SLEEVE FOR A LENGTH-ADJUSTABLE COLUMN FOR CHAIRS

[76] Inventor: Chang Keun Ryu, #1385-12, Juahn 5-dong, Nam-gu, Inchon, Rep. of Korea, 402-205

[21] Appl. No.: 972,674

[22] Filed: Nov. 18, 1997

[30] Foreign Application Priority Data

Nov. 25, 1996 [KR] Rep. of Korea .................. 1996/41821

[51] Int. Cl.$^6$ ..................................................... F16C 31/02
[52] U.S. Cl. ...................... 384/29; 248/161; 297/344.18; 384/291; 384/295
[58] Field of Search ............................ 384/29, 291, 295; 248/161; 297/344.18

[56] References Cited

U.S. PATENT DOCUMENTS 3,923,280 12/1975 Good .
4,756,496 7/1988 Hosan et al. .
5,413,414 5/1995 Bauer .

Primary Examiner—Lenard A. Footland
Attorney, Agent, or Firm—Jacobson, Price Holman & Stern, PLLC

[57] ABSTRACT

A guide sleeve structure for guiding and supporting the cylinder in the spindle guide tube comprising vertical guide webs(110) formed toward the spindle between the radial line of the ribs(130), and the vertical guide grooves toward the spindle in response to the ribs(130) to structurally withhold the expanding and the shrinking of the slide gap caused by the change of temperature.

3 Claims, 2 Drawing Sheets

GUIDE SLEEVE FOR A LENGTH-ADJUSTABLE COLUMN FOR CHAIRS

TECHINICAL FIELD

This invention relates to a guide sleeve for a length-adjustable column for chairs where the slide sleeve can structurally minimize the slide gap caused by the expansion and shrinking of the material and thereby guarantees a more reliable up and down operation of the spindle when it operates upwardly and downwardly in touch with the slide sleeve.

BACKGROUND ARTS

Generally, the guide sleeve for guiding the spindle of the length-adjustable column for chairs has been widely used in manufacturing chairs or tables.

The guide sleeve used in the column is provided with a slide sleeve comprising 6 or more vertical guide webs on its internal surface, projected toward the central longitudinal axis, and the vertical grooves having a larger width than that of the guide webs, both of which, alternate in its order and the multiple ribs(rib web) are formed on the outer surface to receive and support the guide tube.

The guide sleeves having multiple ribs on the outer surface of the guide sleeve were disclosed in U.S. Pat. Nos. 3,923,280, 4,756,496, and 5,413,414. Among them, U.S. Pat. No. 5,413,414, as seen in the FIG. 1, which may be considered to be similar to this invention includes a guide sleeve(10) having a slide sleeve structure for guiding and supporting the spindle(20) in touch with the spindle, an outer tube(15) for receiving the slide sleeve, and the ribs(20) radially formed in the center of the spindle between the slide sleeve structure and the cover surface of the guide sleeve (10).

Further, the above slide sleeve structure, as seen in FIG. 2, has vertically formed guide webs(14) touching the spindle (20), the ribs(13) formed radially toward to the outer surface, and the vertical guide webs(13) formed radially on the internal surface projected toward the spindle(20) in the portion in line with the ribs(13).

In the above slide sleeve structure, the vertical guide webs(14) have smaller width than that of the vertical grooves (12) formed between the vertical guide webs(14). This guide sleeve(10) for length-adjustable chairs forms a conventional slide sleeve structure where the vertical guide webs(14) are projected toward the axis and radially in line with the ribs(13) and in touch the spindle(20).

Furthermore, since the respective components such as vertical guide webs(14) made of resin and ribs(13), and the spindle(20) made of metal are susceptible to temperature change, and cause the slide gap between the vertical guide webs and the spindle to increase and decrease with such temperature change, the conventional guide sleeve cannot maintain an optimal mobility.

With extremely hot temperature, the slide gap between the vertical guide web(14) and the spindle(20) decreases and tightens, and it becomes difficult to control and operate the up and down function of the spindle. The conventional guide sleeve does not consider the susceptibility of the material to the temperature change and thus, unreliable.

Moreover, the conventional device has a small area for the vertical guide webs(14) to touch the spindle(20) and this can cause the webs to easily chip during its up and down operation. Therefore, it is not durable.

Furthermore, the vertical grooves(20) between the vertical guide webs(14) have larger width than that of the vertical guide webs (14) and this makes it difficult to retain oil and therefore, it is difficult to prevent it from breaking and from the noise.

Accordingly, it is an object of this invention to provide a slide sleeve of the guide sleeve for a length-adjustable column for chairs designed in such a way that the slide sleeve of the spindle is not affected by the temperature change so as to guarantee the structural reliability and durability, and to overcome the problems of the conventional sleeve.

In order to achieve the above object, the guide sleeve for the length-adjustable chair of this invention constructed the vertical guide webs, which form radially and project toward the axis between the radial line of the ribs, so as to allow the ribs and the webs of the slide sleeve structure to respond to the change of temperature and thus, minimize the expanding and shrinking of material in the slide gap.

Figure 1:
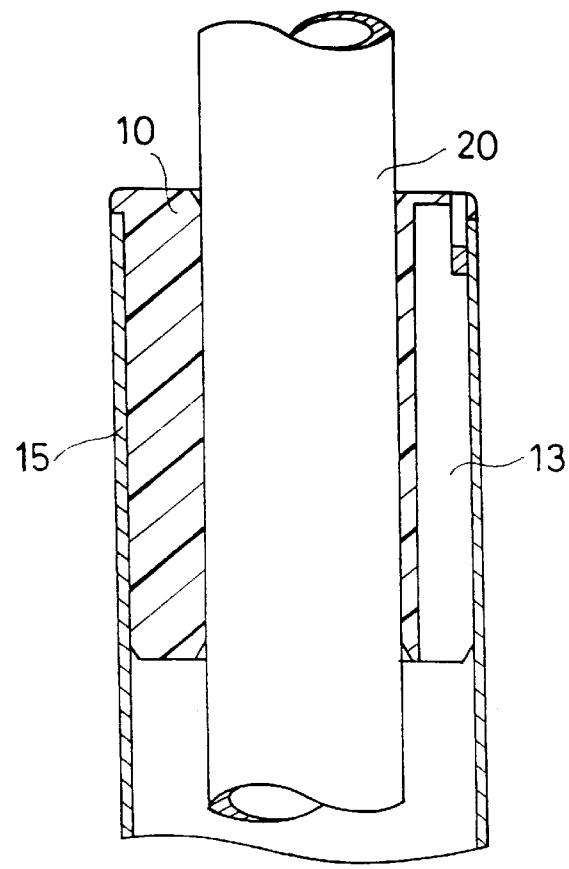
FIG. 1 is a partial section of a conventional length-adjustable column for chairs.
Figure 2:
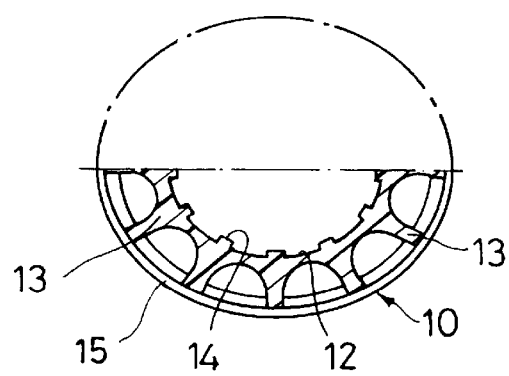
FIG. 2 is a cross-section of the guide sleeve broken partially in the FIG. 1

| Numeral explanation in the drawings | |
|---|---|
| 10: guide tube | 20: spindle |
| 100: guide sleeve | 110: vertical guide web |
| 120: vertical grooves | 130: ribs |
| 140: transverse guide web | |

DESCRIPTION OF THE INVENTION

The more detailed descriptions of the invention are accompanied by the drawings.

Figure 3:
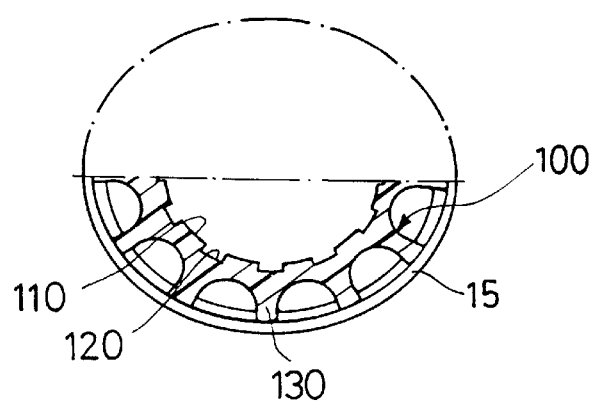
FIG. 3 is a cross-section through guide sleeve broken partially of this invention.

FIG. 3 is the structural view showing the guide sleeve (100) of this invention.

As shown in FIG. 3, the slide sleeve structure received in the guide sleeve(100) comprises of the vertical guide webs (110) structurally formed toward the spindle between the radial lines of the ribs(130) so that the slide gap is not affected by the change in temperature, and the vertical guide grooves formed between the vertical guide webs(110) toward the axis in radial line with the ribs(130).

The width of vertical guide webs(110) of this invention is larger than that of the vertical grooves(b) to minimize the changes in the slide gap caused by the change in temperature. Further, preferably, the total number of vertical guide webs(110) are 12 or less.

Figure 4:
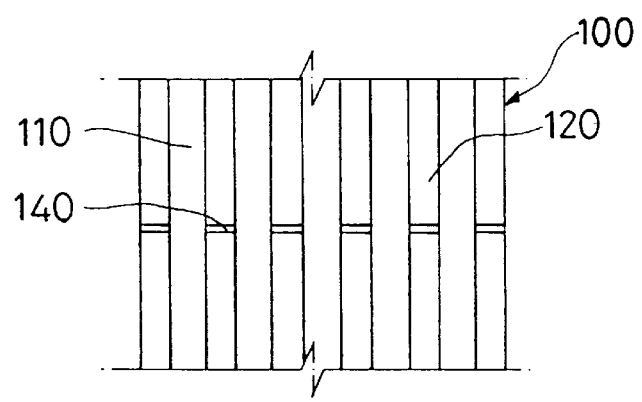
FIG. 4 is unfolded view showing the vertical guide web and transverse guide web of this invention.

As seen in FIG. 4, the above vertical guide webs(110) are provided with transverse webs(140) having the same space to store oil.

The width of the vertical grooves(10) is about the same as the ribs(130) of both the vertical guide webs(110) and the ribs arranged in order on the circumference of the circle to ensure smooth expanding and shrinking operation without any burden to the device.

Figure 5:
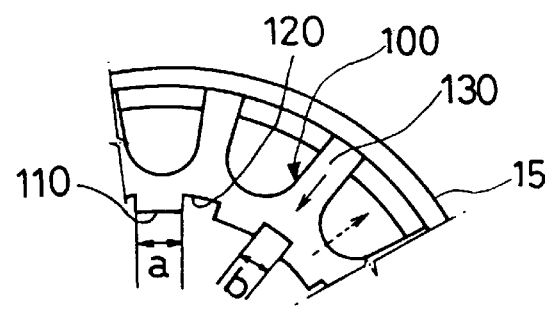
FIG. 5 is a detailed view showing the vertical guide web of this invention.

As shown in the FIG. 3 to FIG. 5, the vertical guide webs(110) of the slide sleeve structure formed with guide sleeve(100) in one body is located between the radial line of the ribs(130) and it functions as the supporter for guiding the spindle in touch with the cylindrical outer surface of the spindle(20).

In this invention, the vertical guide webs(110) and ribs (130) are alternately formed in zigzag motion for flexibility and this ensures that the zigzag arrangements of the guide sleeve and the spindle absorb the expanding and shrinking of the slide gap for optimal up and down operation of the spindle.

In other words, as the temperature drops in the winter, the shrinking of the guide sleeve(100) is minimized by the alternate and zigzag arrangement of the vertical guide webs (110) and ribs(130) to maintain the maximum slide gap, and this guarantees the complete control function for the up and down operation of the spindle(20). Accordingly, the defect in the slide gap between the spindle and the guide sleeve can easily be cured by this invention.

Further, as the slide gap in the guide sleeve(100) expands with the rise in temperature, the alternate arrangement of the vertical guide webs(110) and ribs(130) help absorb the expansion to maintain an appropriate slide gap so as to guarantee a complete control of the up and down operation of the spindle.

In the cold weather, as the resin material shrinks due to the cold temperature, the shrinking of the material is minimized to enable the control function to properly operate and maintain its normal slide gap.

In the hot weather, the expansion of the resin in between the spindle and the ribs is minimized to avoid the tightness.

In addition, the transverse guide webs(140) projected toward the axis between the vertical guide webs(110) promote the storing of oil to maintain a long last lubrication.

EFFECT OF THE INVENTION

This slide sleeve structure for a length-adjustable column for chairs prevents the ineffective up and down operation of the spindle in the slide sleeve, caused by the change of temperature, by making the slide sleeve structure respond to that temperature change.

What is claimed is:

1. A guide sleeve for length-adjustable chairs having the vertical guide webs(110) projected toward to the spindle and formed between the radial lines of ribs(130), and vertical guide grooves(120) formed between the above vertical guide webs(110) toward the spindle in relation to the ribs(130).

2. A guide sleeve of a length-adjustable device for chairs according to claim 1, where the vertical guide webs(110) have a larger width than that of the vertical grooves(120).

3. A guide sleeve of a length-adjustable device for chair according to claim 1, where the total number of vertical guide webs(110) are 12 or less.

* * * * *